Patented Jan. 10, 1933

1,893,819

UNITED STATES PATENT OFFICE

JAMES N. CURRIE, JASPER H. KANE, AND ALEXANDER FINLAY, OF BROOKLYN, NEW YORK, ASSIGNORS TO CHARLES PFIZER & COMPANY, OF BROOKLYN, NEW YORK, A CORPORATION OF NEW JERSEY

PROCESS FOR PRODUCING GLUCONIC ACID BY FUNGI

No Drawing.     Application filed February 9, 1931.   Serial No. 514,694.

This invention relates to the production of gluconic acid and salts of gluconic acid, and more particularly to the production of gluconic acid by fungi or molds.

An object of this invention is to provide a practical method of producing gluconic acid by fungi or molds whereby a high yield may be continuously obtained on a commercial scale in a short time.

We have discovered that by maintaining a nutrient liquor in a state of high agitation in the presence of oxygen, the optimum temperature may be substantially raised, the yield increased, and the time reduced.

We have had particularly favorable and unexpected results in converting carbohydrates to gluconic acid or salts thereof by using fungi such as *Aspergillus niger* or *Penicillium luteum* maintained in a continuous state of high agitation. We have found that under such conditions, as distinguished from conditions heretofore used where the fungi were allowed to grow in the form of a mycelium on the surface of a shallow layer of liquor, the optimum temperature can be materially raised. Thus for the shallow process using *Aspergillus niger*, the optimum temperature is held within 2° C. above or below the mean optimum temperature of 32° C., and with *Penicillium luteum* 2° C. above or below the mean optimum temperature of 25° C. With the agitation process of this invention using the same fungi, the optimum temperatures are about 2° C. above or below the mean optimum temperature of 40° C. and 35° C., respectively thus showing in general a raise in mean optimum temperature of 8 to 10° C. by our process. 5° C. above or below the extreme optimum temperature is within our invention. We have found that the agitation must be such as to supply the requisite oxygen and maintain the fungi subdivided and substantially in dispersion or suspension throughout a foamy liquor, which is quite different from the stirring or circulation heretofore proposed for the liquor under the top mycelium in the surface process. Also, with this invention the liquor can be inoculated with spores or with broken up mycelium.

A considerable variety of stirrer types can be used to give satisfactory results, and the type to some extent depends upon the size and shape of the vessel which should be relatively deep, position in the vessel, rate of rotation, etc., as a balance must be maintained between these several factors to secure the best results. A specific example of suitable apparatus is a quart size glass vessel and a beverage mixing stirrer driven at 1000 to 3000 revolutions per minute, a satisfactory type being that known as Polar Cub B88; but various paddles, centrifugal pumps, propellers, etc., are all effective when adjusted to the vessel, and we do not restrict ourselves to any particular apparatus. With any apparatus the object is to continuously draw large volumes of air, or oxygen and air, or oxygen and other gas into the liquor distributed in small globules throughout the mass, with the result of producing a homogeneous foamy mass of liquor with finely interspersed bubbles. The oxygen can be supplied through the vortex formed by a stirrer, or by common forms of distributors for gases in chemical reactions.

*Example.*—The fermentation liquor contains small amounts of nutrient salts, such as ammonium nitrate, potassium biphosphate and magnesium sulfate, as well as d-glucose and spores or broken up mycelium of *Aspergillus niger*. The d-glucose present may vary from 5 to 35 per cent; a 20 per cent solution gives a very favorable concentration. In place of d-glucose any carbohydrate which can be converted to d-glucose by *Aspergillus niger*, such as maltose, sucrose, etc. may be employed. The liquor is maintained at a temperature of about 1 or 2° C. above or below 40° C. mean optimum and continuously agitated by a suitably designed stirrer going at 1000 to 3000 revolutions per minute. Within 48 to 60 hours the sugar is almost completely converted to d-gluconic acid and a yield of about 90 per cent of the theoretical is obtained. The time required to complete the fermentation is reduced if a suitable neutralizing agent, such as calcium carbonate or hydroxide is added at the beginning of the fermentation, or at intervals, or continuously during the fermentation, it being desirable to keep the acid concentration below 15%. The gluconic acid or salts of gluconic acid may be recovered by the known procedures. Other neutralizing agents for gluconic acid can be used instead.

If *Penicillium luteum* is used the ingredients of the solution are the same except that the optimum temperature will be about 2° C. above or below the mean optimum temperature of 35° C.

If the temperatures are too low or there is insufficient aeration, small amounts of other organic acids may be formed.

While we prefer *Aspergillus niger*, favorable results have been obtained as stated with *Penicillium luteum*, but we do not restrict ourselves thereto, as there are many other fungi known in the art, or the same fungi differently named, which will act in the same improved manner under the aerated foamy conditions herein specified, and generally at temperatures above those ordinarily used in still or gently stirred processes.

The invention claimed is:

1. Process of producing gluconic acid comprising forming a solution of glucose and nutrient substances, supplying a gluconic acid generating mold, and maintaining aeration and agitation such as to disperse the growing mold and oxygen through the solution.

2. Process of producing gluconic acid comprising forming a solution of glucose and nutrient substances, supplying a gluconic acid generating mold, and maintaining such aeration and agitation at a temperature above the optimum temperature of the mold for a still mycelium as to disperse the growing mold and oxygen through the solution.

3. Process of producing gluconic acid comprising forming a solution of 5 to 35% of glucose and a small amount of nutrient substances, supplying a gluconic acid generating mold, and maintaining such aeration and agitation at a temperature from 3° C. to 15° C. above the normal optimum temperature of the mold as to disperse the growing mold and oxygen through the solution.

4. A process for the production of d-gluconic acid by the action of a gluconic acid generating mold grown in a deep layer of aerated foamy liquor containing nutrient substances and d-glucose in such manner as to promote growth throughout the liquor.

5. A process for the production of d-gluconic acid by the action of *Aspergillus niger* grown in a deep layer of aerated foamy liquor containing nutrient salts and a carbohydrate capable of being converted to d-gluconic acid by *Aspergillus niger* in such manner as to promote the growth throughout the liquor.

6. A process for the production of d-gluconic acid by the action of *Penicillium luteum* grown in a deep layer of aerated foamy liquor containing nutrient salts and a carbohydrate capable of being converted to d-gluconic acid by *Penicillium luteum* in such manner as to promote the growth throughout the liquor.

7. A process for the production of d-gluconic acid by the action of *Aspergillus niger* grown in a deep layer of aerated foamy liquor containing a small amount of nutrient salts and 5 to 35% of a carbohydrate capable of being converted to d-gluconic acid by *Aspergillus niger*, maintained at a temperature of 33°–47° C. in such manner as to promote the growth throughout the liquor.

8. A process for the production of d-gluconic acid by the action of *Penicillium luteum* grown in a deep layer of aerated foamy liquor containing a small amount of nutrient salts and 5 to 35% of a carbohydrate capable of being converted to d-gluconic acid by *Penicillium luteum*, maintained at a temperature of 28°–42° C. in such manner as to promote the growth throughout the liquor.

9. A process for the production of d-gluconic acid by the action of a gluconic acid generating mold grown in a deep layer of liquor containing d-glucose and nutrient salts, the liquor being aerated by high speed agitation while drawing large volumes of air into the liquor and dispersing it in fine globules throughout the mass of liquor.

10. A process for the production of d-gluconic acid by the action of a gluconic acid generating mold grown in a deep layer of liquor containing nutrient salts and d-glucose that is aerated and agitated by a current of air passed in at the bottom of the liquor.

11. A process for the production of d-gluconic acid by the action of a gluconic acid generating mold grown in a deep layer of liquor containing nutrient salts and d-glucose and through which a current of gas comprising oxygen, is being conducted.

12. A process for the production of d-gluconic acid by the action of a gluconic acid generating mold grown in a deep layer of liquor containing nutrient salts and d-glucose that is aerated and agitated by the combined action of a stirrer and a current of gas comprising oxygen.

13. A process for the production of gluconic acid and salts of gluconic acid by the action of a gluconic acid generating mold grown in a deep layer of liquor containing d-glucose and nutrient salts, and a neutralizing agent, the liquor being aerated and agitated in such a manner as to promote the growth of the mold through the liquor.

14. A process for the production of a mixture of organic acids, consisting substantially of d-gluconic acid by the action of a gluconic acid generating mold grown in a deep layer of liquor containing nutrient salts and a carbohydrate, the liquor being agitated and aerated in such a manner as to promote the growth of the mold throughout the liquor.

15. A process for the production of a mixture of organic acids consisting substantially of d-gluconic acid by the action of *Aspergillus niger* in a deep layer of liquor containing nutrient salts, a carbohydrate and a neutralizing agent, the liquor being agitated and aerated in such a manner as to promote growth of *Aspergillus niger* throughout the the liquor.

16. A process for the production of a mixture of organic acids consisting substantially of d-gluconic acid by the action of *Penicillium luteum* in a deep layer of liquor containing nutrient salts, a carbohydrate and a neutralizing agent, the liquor being agitated and aerated in such a manner as to promote growth of *Penicillium luteum* throughout the liquor.

Signed at New York in the county of Kings and State of New York this 6th day of February A. D. 1931.

JAMES N. CURRIE.
JASPER H. KANE.
ALEXANDER FINLAY.